Jan. 17, 1961     H. T. WELLENDORF     2,968,140
SHIELD DEVICE FOR CORN PICKER-MOUNTED TRACTORS
Filed Dec. 18, 1958
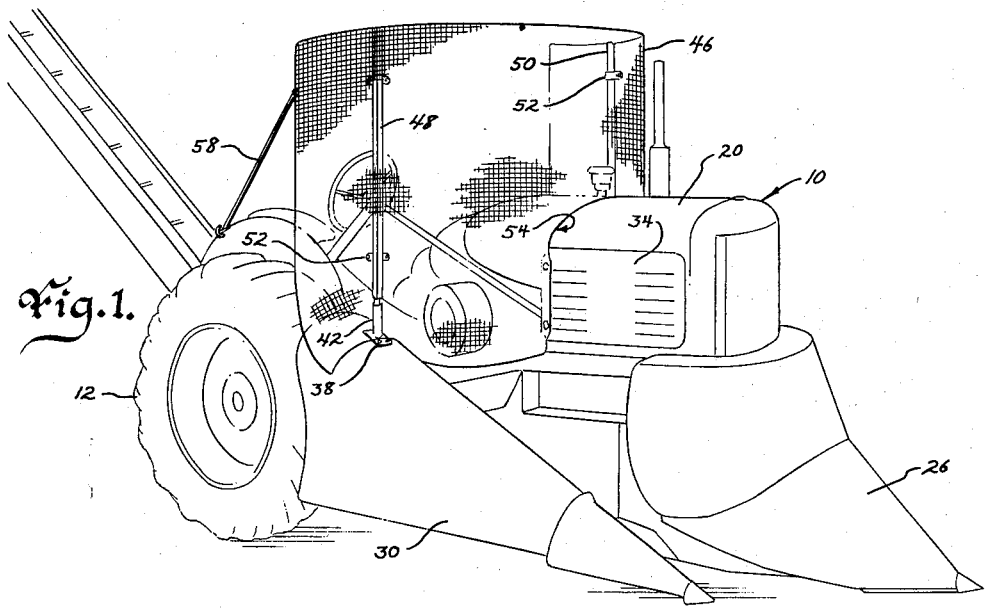
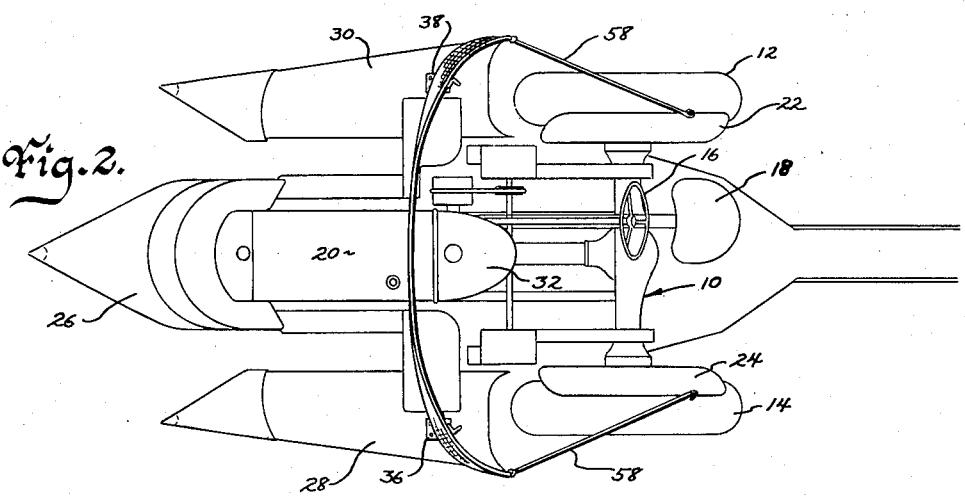
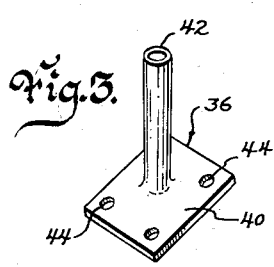
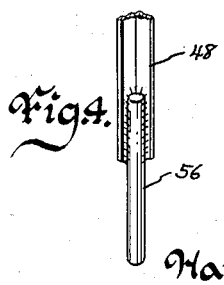
Witness
Edward P. Seely
Inventor
Hans Theodore Wellendorf
by Donald H. Jarley
Attorney

United States Patent Office 2,968,140
Patented Jan. 17, 1961

2,968,140

SHIELD DEVICE FOR CORN PICKER-MOUNTED TRACTORS

Hans Theodore Wellendorf, Box 336, Schleswig, Iowa

Filed Dec. 18, 1958, Ser. No. 781,375

3 Claims. (Cl. 56—119)

My invention relates to shield devices and more particularly to shield devices for harvesting implements.

Even with modern equipment, the harvesting of corn is a very difficult operation, especially in very dry weather. Because corn grows to a height substantially equal to the elevation of the operator's position on the tractor, the operator is subjected to repeated contact with leaves, stalks and dried tassels. This is particularly true when the wind is blowing during the harvesting operation. Not only does the foreign material serve as a nuisance to the operator, but it can also be injurious, particularly to the eyes. Furthermore, the material collects around the control and operating mechanisms of the tractor and picker and must be continually removed. In some instances, this material causes malfunction of the machine, and a collection of this material on the tractor always creates a fire hazard. Such a fire endangers not only the tractor and operator, but also the entire field of corn. Clearing the machine of this material invites injury to the operator since the corn picker is an inherently dangerous mechanism.

Therefore, the principal object of my invention is to provide a shield device for corn picker-mounted tractors which will protect the operator from being struck by any portion of the corn plants.

A further object of my invention is to provide a shield device for corn picker-mounted tractors which will prevent debris from accumulating on the tractor and corn picker mechanism.

A still further object of my invention is to provide a shield device for corn picker-mounted tractors which can be easily attached to machines of various descriptions.

A still further object of my invention is to provide a shield device for corn picker-mounted tractors which can be easily attached and then removed from the tractor mechanism.

A still further object of my invention is to provide a shield device for corn picker-mounted tractors which is economical of manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my device mounted on a tractor which in turn has a corn picking machine mounted thereon;

Fig. 2 is a top view of my device as mounted on the corn picker-mounted tractor;

Fig. 3 is a perspective view of the bracket element which supports my device; and Fig. 4 is a perspective view of the post elements which are removably inserted into the brackets of Fig. 3.

I have used the numeral 10 to generally designate a farm tractor which has rear wheels 12 and 14, steering apparatus 16, seat portion 18, motor unit 20, and wheel fenders 22 and 24. The corn picking mechanism is comprised of a divider 26 which is mounted on the frontward end of the tractor 10 and two forwardly extending gathering units 28 and 30 which are mounted on the sides of the tractor. Divider 26 and gathering units 28 and 30 are of conventional design and are tapered to a point on their respective forward ends and extend in substantial parallel relation with the ground surface. The numeral 32 designates the rearward cowling of the tractor and the numeral 34 designates the conventional hood element which encloses the tractor motor 20 in conventional fashion.

Brackets 36 and 38 are identical and are comprised of a plate 40 which has a hollow tube 42 extending therefrom. Plate 40 and tube 42 should form an angle with each other so that when the bracket is placed on the top of the tapered gathering units 38 and 30, the tube 42 will be extending in a vertical direction. Plate 40 may have several holes 44 drilled therein for purposes of bolting the brackets to the gathering units as shown in Fig. 1. The brackets 36 and 38 can be bolted or otherwise secured to the upper top portions of the gathering units 28 and 30.

A flexible screen device 46 is secured in any convenient manner to vertical angles 48 and 50. The exact means of connection between screen 46 and the two angles is not critical although I prefer to use a series of washers and bolts extending through the screen and the angles or in some instances to also use these elements in combination with a clip member 52. Screen 46 should be substantially rectangular in shape and the angles 48 and 50 should be so positioned on screen 46 that when screen 46 is in a vertical position, the angles will also be in a vertical position. The lower center section of the screen 46 should be cut out to form an opening 54 which substantially coincides with the cross sectional shape of the cowling 32. The lower portion of angles 48 and 50 terminate in a round rod 56 which is adapted to extend into the hollow tube 42 of brackets 36 and 38. As shown in Fig. 4, rods 56 can be easily welded to the angles 48 and 50.

Figs. 1 and 2 show flexible tie strings 58 secured to the upper side portions of screen 46. Strings 58 are tied by one of their ends to the screen 46 and can be extended rearwardly to be tied to the fender members 22 and 24 of tractor 10. The exact point that strings 58 are tied to the tractor is not critical as long as the point of attachment is rearwardly of the screen 46.

Screen 46 can be attached to the hood elements 34 in any convenient manner such as by utilizing bolts and washer assemblies. The exact means of attachment between screen 46 and the hood elements 34 is not too critical but the screen and hood elements should be secured, as shown in Fig. 1 of the drawings. However, the securing means between the screen and hood elements should be of such a nature that they could be easily detached from each other.

The normal operation of my device is as follows: Brackets 36 and 38 should be mounted on gathering units 28 and 30, respectively, in the positions shown in Figs. 1 and 2. Screen 46, with angles 48 and 50 secured thereto, should then be placed over the cowling 32 with the cut out portion 54 in the screen embracing the cowling. The rods 56 on the ends of angles 48 and 50 should then be inserted into the upwardly extending hollow tubes 42 on brackets 36 and 38. The mounting of the rods in the brackets in the manner described will support the screen 46 in a vertical position. The screen 46 should then be bolted or otherwise secured to the hood element 34 as described above. The length of screen 46 should be great enough to extend between the two angles 48 and 50 and should preferably extend outwardly therefrom as shown in Figs. 1 and 2. Tie strings 58 can thereupon have their rearward ends secured to the tractor 10 at a point rearwardly of the screen 46 to exert leverage against the angles 48 and 50 to hold the screen 46 in a stabilized position. Since the bottom of the screen 46 is flexible, it can easily be shaped to conform to different shapes in the tractor-corn picker mechanism.

From the foregoing, it will be seen that the tractor operator is completely protected from stalks of corn that may be leaning into his path from adjacent rows, as well as being protected from flying debris. My screen is flexible and can be bent at its bottom portion to conform to variations in the shapes of various tractors. The strings 58 and angles 48 and 50 cooperate together to hold my device in a stabilized position, and yet my device can be easily and quickly removed from the harvesting machines. Corn leaves and the like will be kept out of the area of the operator's position which will avoid the need of repeatedly cleaning this debris away. Not only does this prevent the loss of time and danger of fire, but it also gives the operator more efficient control of the machine. A further important function that my device accomplishes is that the operator cannot practice the very dangerous act of walking up and down the gathering units 28 and 30 to get on and off the tractor.

Thus, from the foregoing, it is seen that my device will accomplish at least all of its stated objectives.

Some changes may be made in the construction and arrangement of my shield device for corn picker-mounted tractors without departing from the real spirit and purpose of my invention, and it is my intention to cover by my claims, any modified forms of structure or use of mechanical equivalents which may be reasonably included within their scope.

I claim:

1. In combination, a tractor having an operator's station on its rearward portion, a corn picking machine mounted on said tractor and having two gathering units adjacent the respective sides of said tractor, and a vertical screen transversely mounted on said tractor and said corn picking machine to separate the forward portion of said tractor and said corn picking machine from said operator's station; at least the bottom edge portion of said screen being flexible.

2. In combination, a tractor having an operator's station on its rearward portion, a corn picking machine mounted on said tractor and having two gathering units adjacent the respective sides of said tractor, and a vertical screen transversely mounted on said tractor and said corn picking machine to separate the forward portion of said tractor and said corn picking machine from said operator's station; the bottom portion of said screen being flexible and substantially conforming to the shape of those portions of said tractor and said corn picking machine underneath said screen.

3. In a shield device adapted for use on tractors having corn picking machines mounted thereon, a screen member, means on said screen member for securing it adjacent the operator's station on a tractor and corn picking machine; the lower edge of said screen being flexible to permit said screen to conform to the shape of those portions of said tractor and said corn picking machine underneath said screen.

References Cited in the file of this patent

UNITED STATES PATENTS

| | | |
|---|---|---|
| 2,284,909 | Kuhlman | June 2, 1942 |
| 2,451,553 | Headquist et al. | Oct. 19, 1948 |
| 2,860,476 | Francis et al. | Nov. 18, 1958 |